United States Patent
Richardson, Jr.

(10) Patent No.: US 6,263,838 B1
(45) Date of Patent: *Jul. 24, 2001

(54) VEHICLE FUEL GENERATION AND POLLUTION-FREE OPERATION

(76) Inventor: William H. Richardson, Jr., 1496 Giles St., Palm Bay, FL (US) 32907

( * ) Notice: Subject to any disclaimer, the term of this patent is extended or adjusted under 35 U.S.C. 154(b) by 0 days.

This patent is subject to a terminal disclaimer.

(21) Appl. No.: 08/980,853

(22) Filed: Nov. 29, 1997

Related U.S. Application Data

(63) Continuation-in-part of application No. 08/329,983, filed on Oct. 27, 1994, now Pat. No. 5,692,459, which is a continuation-in-part of application No. 08/162,342, filed on Dec. 2, 1993, now Pat. No. 5,435,274, which is a continuation-in-part of application No. 07/854,938, filed on Mar. 20, 1992, now abandoned, which is a continuation-in-part of application No. 07/613,094, filed on Nov. 15, 1990, now abandoned.

(51) Int. Cl.[7] .................................................. F02B 43/08
(52) U.S. Cl. ....................................... 123/3; 123/DIG. 12
(58) Field of Search ................................ 123/DIG. 12, 3

(56) References Cited

U.S. PATENT DOCUMENTS

| | | | |
|---|---|---|---|
| 3,648,668 | * 3/1972 | Pacheco | 123/3 |
| 4,003,344 | * 1/1977 | Bradley | 123/3 |
| 4,369,737 | * 1/1983 | Sanders et al. | 123/DIG. 12 |
| 4,442,801 | * 4/1984 | Glynn et al. | 123/DIG. 12 |
| 4,520,764 | * 6/1985 | Ozawa et al. | 123/DIG. 12 |
| 5,007,381 | * 4/1991 | Kakegawa et al. | 123/DIG. 12 |
| 5,159,900 | * 11/1992 | Dammann | 123/3 |
| 5,417,817 | * 5/1995 | Dammann et al. | 123/3 |
| 5,435,274 | * 7/1995 | Richardson, Jr. | 123/3 |
| 5,452,688 | * 9/1995 | Rose | 123/3 |
| 5,692,459 | * 12/1997 | Richardson, Jr. | 123/3 |

* cited by examiner

Primary Examiner—Erick Solis
(74) Attorney, Agent, or Firm—Charles A. McClure

(57) ABSTRACT

Mechanically or electrically driven vehicles suitable for air, land, or sea transport are operated substantially pollution-free on a fuel gas derived by pyrolysis of carbon and water via underwater arcing between electrodes, optionally on-board. A carbon rod may serve as an electrode or preferably be inserted end-on between a plurality of electrodes, preferably composed of graphite. The fuel is combusted in an engine having mechanical output useful directly as motive power for the vehicle or indirectly to operate a generator of electrical output to motors driving the vehicle motive means.

16 Claims, 5 Drawing Sheets

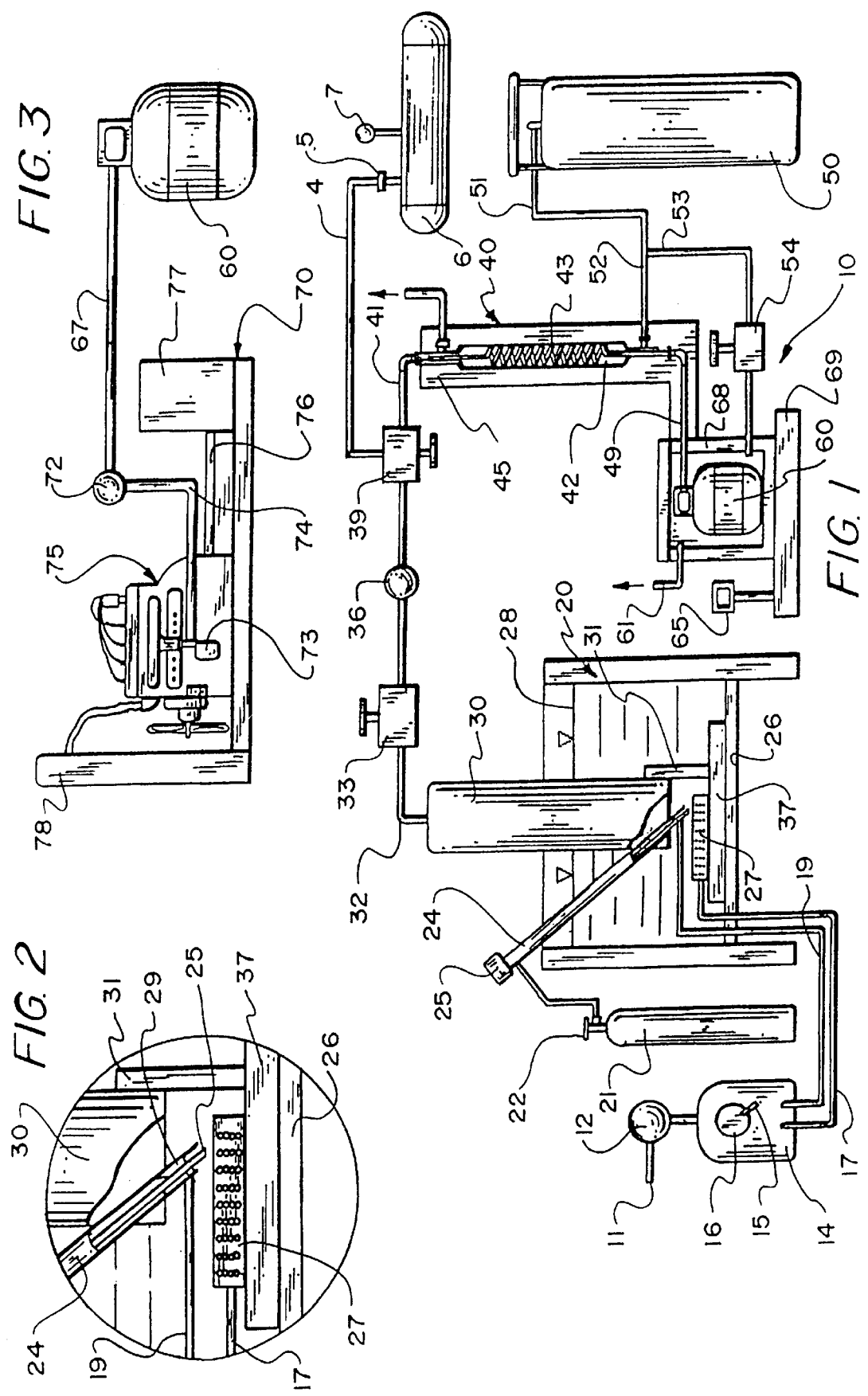

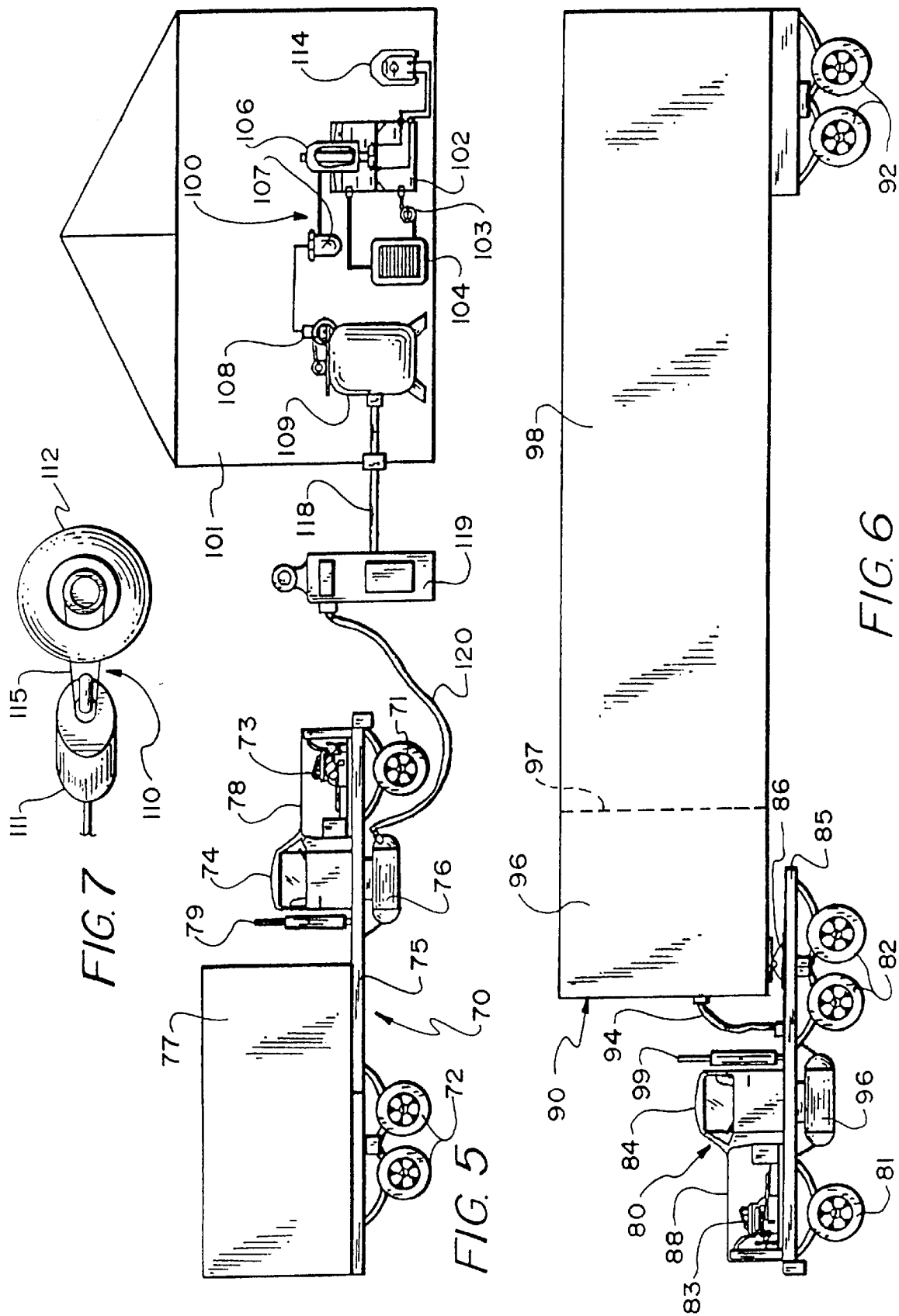

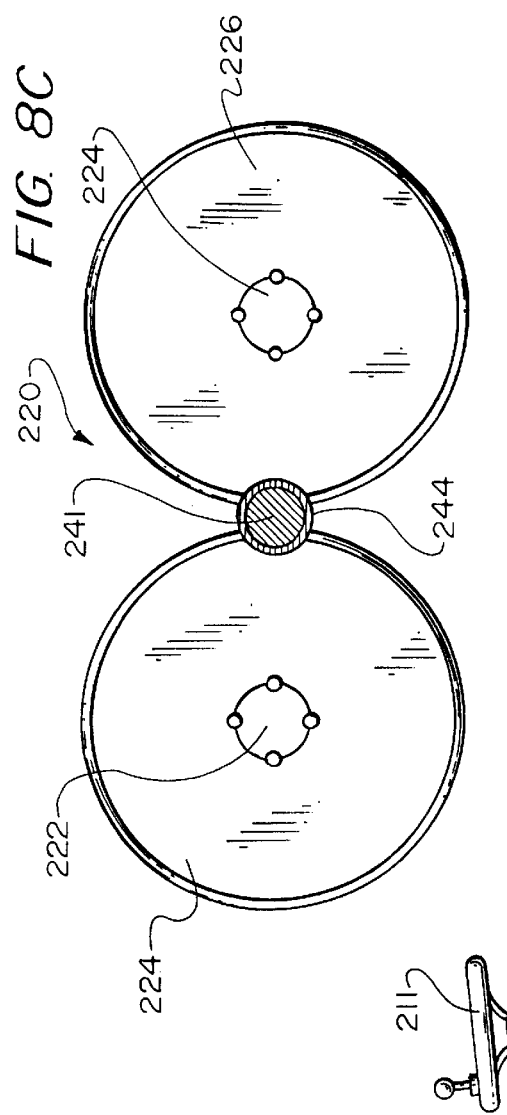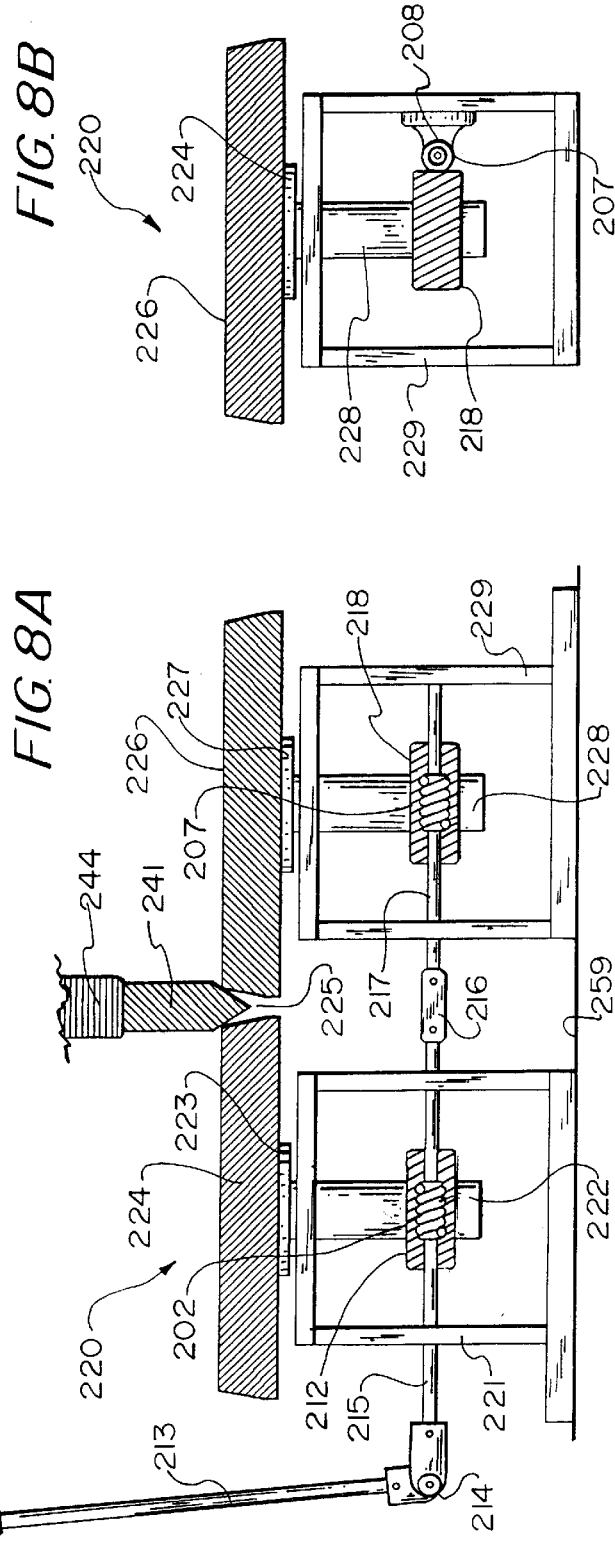

VEHICLE FUEL GENERATION AND POLLUTION-FREE OPERATION

This is a continuation-in-part of my copending application, Ser. No. 08/329,983 filed Oct. 27, 1994 (U.S. Pat. No. 5,692,459), itself a continuation-in-part of Ser. No. 08/162,342 filed Dec. 2, 1993 (U.S. Pat. No. 5,435,274), each of which was a continuation-in-part of Ser. No. 07/854,938 filed Mar. 20, 1992, as a continuation-in-part of Ser. No. 07/613,094 filed Nov. 15, 1990 (both of them eventually abandoned).

TECHNICAL FIELD

This invention relates to motor vehicles powered by combustion engines and operable substantially pollution-free on given fuel gas.

BACKGROUND OF THE INVENTION

Combustion effluents of fossil fuels, such as coal, petroleum (including diesel oil, kerosene, jet fuel, and gasoline), and even natural gas, contain, in addition to customary carbon dioxide and water, undesirable hydrocarbon fragments and derivatives, often in particulate form, carbon monoxide, and gaseous oxides of nitrogen and/or of sulfur transformable to noxious droplet form (acid rain).

Hydrogen was long-considered an ideal fuel because convertible completely to water via air combustion. See century-old Eldridge U.S. Pat. No. 603,058 for an Electrical Retort wherein an air arc flashed water to steam then pyrolyzed it and electrode carbon. Yet hydrogen is unsatisfactory as fuel for an internal-combustion engine because it heats the intake valves—ahead of the combustion chamber—and causes pre-ignition flashback, which is deleterious to the engine operation and structure, and is conducive to emission of harmful nitrogen oxides (aptly: "NOx") into the atmosphere. An instructive reference is *HYDROGEN STORAGE AND UTILIZATION IN TRANSPORTATION VEHICLES—SUMMARY*, United States Department of Energy, Alternative Fuels Utilization Program, Office of Transportation Systems (1988).

Many places are polluted by emissions from combustion of fossil fuels by motor vehicles, lawnmowers, heating systems, manufacturing plants, or electricity generation, despite many laws and safeguards. My invention is the first and (so far) only solution to the problem.

SUMMARY OF THE INVENTION

A primary object of the present invention is operation of motor vehicles without pollution of the environment.

Another object of this invention is to fuel combustion in such a way that it is substantially free of harmful emissions.

A further object of the invention is to enable substantially pollution-free operation of internal-combustion engines.

Yet another object of the invention is to enable motor vehicles to generate on-board fuel for electrical or mechanical motive power.

A still further object of the invention is to render production of electrical energy for use by motor vehicles more environmentally friendly than electrical generation customarily is nowadays.

A still further object of this invention is to accomplish the foregoing objects more economically than possible with fossil fuels, preferably taking into account environmental as well as other costs.

In general, the objects of this invention are attained using fuel gas combustible substantially completely to carbon dioxide and water vapor, usually in an internal-combustion engine or equivalent.

That fuel preferably is generated by underwater carbon arcing, wherein both carbon and water are pyrolyzed into gaseous condition and air-combustible to carbon dioxide and water, free of pollutants.

More particularly, motor vehicles are fueled according to this invention and thereby enabled to combust the fuel pollution-free and to be driven either directly through engine-produced motive power or indirectly by electricity generated by engine-produced motive power.

In addition, this invention enables vehicles with considerable fuel requirements to produce fuel gas on board—advantageous for sea transport vessels as well as for transcontinental trains or trucks.

Other objects of the present invention, together with means and methods for attaining the various objects, will become apparent from the following description and the accompanying diagrams of preferred embodiments, presented by way of example rather than limitation.

SUMMARY OF THE DRAWINGS

FIG. 1 is a schematic diagram of a first embodiment of the fuel gas evolving apparatus of this invention, including compression and storage equipment, and optional liquefaction means for the fuel gas;

FIG. 2 is a fragmentary side elevation of the carbon arc and vicinity, on an enlarged scale, in the same gas-evolving apparatus;

FIG. 3 is a schematic side elevation of an internal-combustion engine running on stored fuel gas of the invention to produce output motive power for mechanical transmissions or electrical generators;

FIG. 5 is a schematic side elevation of a truck having its fuel tank refilled with fuel of this invention via a filling station;

FIG. 6 is a schematic side elevation of a tractor and hitched semi-trailer for generating fuel gas and carrying cargo (not shown);

FIG. 7 is a fragmentary schematic view of a driving wheel and vicinity, of an optional electric motor drive for a motor vehicle;

FIGS. 8A, 8B, and 8C are respectively front and side elevation and sectional plan views of an alternative electrode embodiment.

DESCRIPTION OF THE INVENTION

Figure 4:
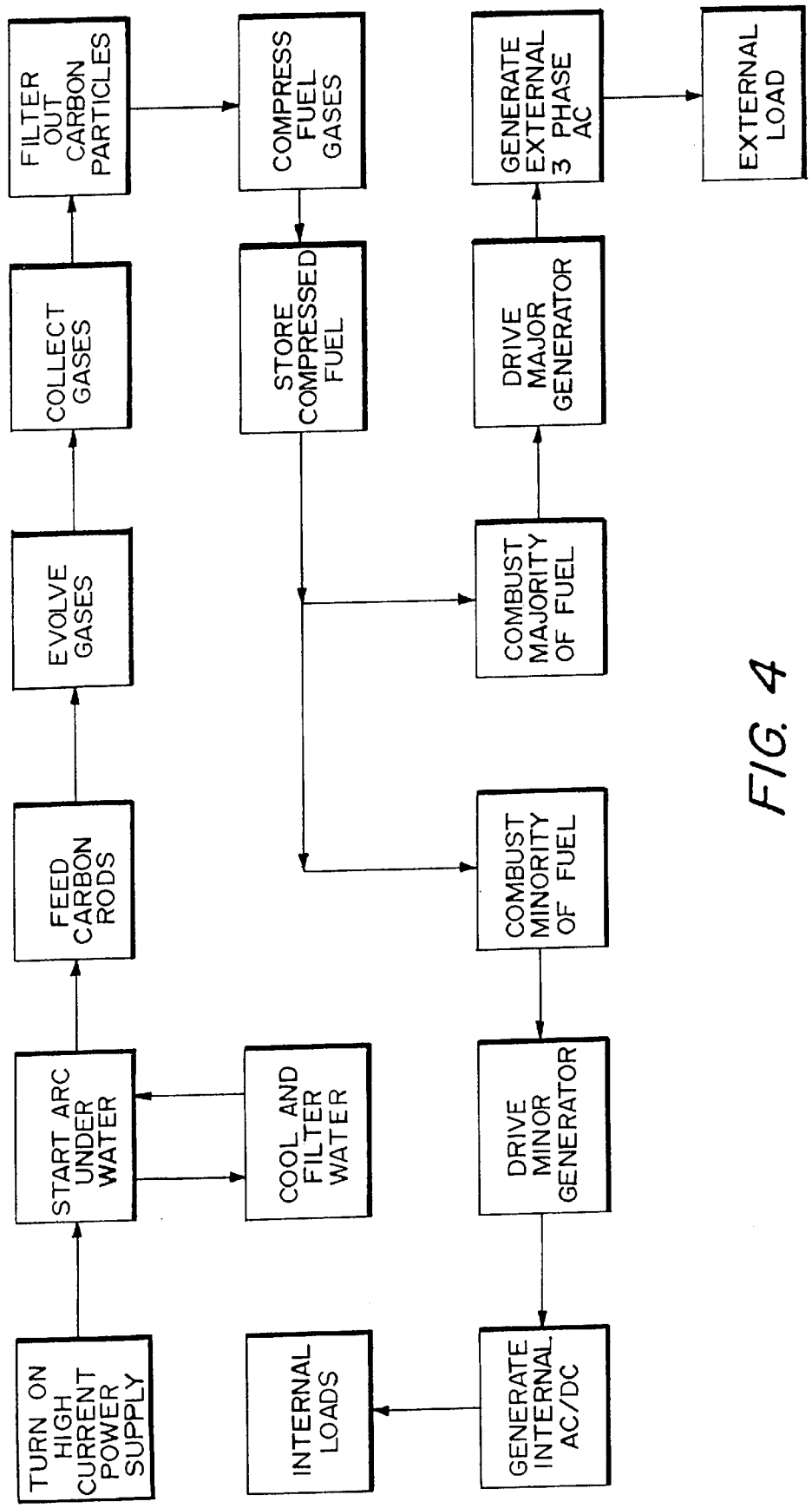
FIG. 4 is a schematic block diagram of evolving, compressing and storing the fuel gas, and combusting it for power generation.

FIG. 1 shows, in schematic side elevation, partly in section, an embodiment of apparatus 10 adapted to evolve, collect, compress, and liquefy fuel gas of this invention. It features, at the left, electrical meter 12 connected to an external source (not shown) of electrical power via pair of leads 11, and connected by pair of leads 13 to welder 14, with heavy-duty electrical output adjustable by setting of arm 15 on dial 16, and connected by pair of heavily insulated leads 17, 19 to respective electrodes 27, 24 in tank 20. The tank is filled with water (shading) to level 28 near its top.

FIG. 2 shows details of part of the apparatus in tank 20 of FIG. 1 on an enlarged scale, including especially lead 17 connected to graphite block electrode 27, lying on insulating slab 27 on raised floor 26 of the tank, whereas lead 19 connects to the lower end of oblique magazine 24—partly sectioned away to show (shaded) contactor portion 29 of the magazine, fitting closely around carbon rod 25 to assure electrical contact just above its protruding lower end. Cylindrical hood 30, upright on support 31 upstanding from the bottom of tank 20, is open at its submerged bottom end in the water above the nearest approach of the magazine to the block electrode.

FIG. 1 also shows, cylinder 21 (inert flushing gas) with valve 22 connected by tubing 23 to the upper end of magazine 24, which is capable of holding at least several carbon rods and is covered by cap 25 except during loading of the rods. Fuel transport tube 32 connects the top of gas-collecting hood 30 through in-line isolation valve 33 and compression pump 39 to three-way distribution valve 39, openable either to upper branch line 4 or to lower branch line 41. The upper branch line leads from the distribution valve to coupling 5 of fuel gas storage container 6 having pressure valve 7 thereon. Successive containers may be connected to the line for filling, and be disconnected therefrom for storage when filled.

Lower branch line 41 from distribution valve 39 leads to the top of condenser 40 inside insulating jacket 45, where it connects to the top end of helical condenser tube 43, whose bottom end connects via outlet tube 49 to (liquid fuel) container 60. The helical tube is surrounded by condenser jacket 42, which has vent tube 41 at its upper end and is supplied at its lower end with coolant from tank 50 (valve not shown) via tube 51 and branch tube 52. Branch tube 53, when its valve 54 is open, feeds coolant around container 60 in insulated box 68, with vent 61 and cover 62, on balance base 69 with scale 65—for weight of the container and its contents.

FIG. 3 shows internal-combustion engine apparatus 70, with cooling radiator at the left. Engine 75 is fed with fuel gas boiling off from container 60 via outlet tube 67 through valve 72 and to the engine intake via tube 74. Air reaches the engine from the atmosphere via adjacent adapter or butterfly valve 73. Drive shaft 76 connects engine motive output to gearbox or electrical generator 77.

It will be understood that motor vehicles, such as automobiles, locomotives, tractors, and trucks, may be operated by application of conventional motive output from a combustion engine to their driving wheels, or alternatively may be operated by application of motive output to electrical generating equipment whose electrical output operates motors mechanically connected to such vehicle drive wheels. This invention is adapted equally well to such so-called "hybrid" motor vehicles as well as those with conventional mechanical drives.

Aircraft and watercraft may be propelled similarly, whether by motive output from a combustion engine or by equivalent electrical driving of propeller or screw means (cf. drive wheels). Not only may ships burn the fuel gas of this invention in the combustion chambers of steam boilers or in formerly diesel-fueled engines, but aircraft also may run on this fuel instead of jet fuel or gasoline.

FIG. 4 shows, in block form, a flow diagram of this invention, with fuel generation steps predominating nearest the top, and fuel conversion and power generation steps near the bottom, of the view.

Sequential steps in the fuel generation part of this invention include (1) TURN ON HIGH CURRENT POWER SUPPLY, (2) START ARC UNDER WATER, (3) FEED CARBON RODS, (4) EVOLVE GASES, (5) COLLECT GASES, (6) FILTER OUT CARBON PARTICLES, (7) COMPRESS FUEL GASES, and (8) STORE COMPRESSED FUEL. The last two mentioned steps are performed upon the evolved fuel gas. Accessory composite steps (9) COOL AND FILTER WATER maintain water conditions as desired, especially at the hot underwater arc locus of gas evolution—from which evolved gases bubble up through intervening water, heating it, and into the overlying hood, to be collected and stored for fuel use as indicated.

Subsequent sequential steps in FIG. 4 include arrows and lines from the Store Compressed Fuel step downward to the lower part of the view, and a pair of symmetrically located steps, (16) COMBUST MINORITY OF FUEL (at left), and (11) COMBUST MAJORITY OF FUEL. Next are the sequential steps of (12) DRIVE MAJOR GENERATOR, (13) GENERATE EXTERNAL 3Ø AC. A final arrow on the right terminates at (14) EXTERNAL LOADS. To the left from the step (15) COMBUST MINORITY OF FUEL are the sequential steps of (16) DRIVE MINOR GENERATOR and (17) GENERATE INTERNAL AC/DC terminating at (18) INTERNAL LOADS.

The fuel gas input materials are inexpensive carbon and water. Also required is a source of electrical energy sufficient to strike an underwater arc, which is readily maintained with little energy input because of its negative temperature coefficient of resistance. Once struck, the arc is readily maintained, and requires much less energy input than is subsequently obtainable as output by combustion of the fuel gas evolved via the high-temperature (5–6000° F.) arc.

FIG. 5 shows, in schematic side elevation, a filling station (at right) providing fuel of this invention to truck 70 (at left). The truck has cab 74 and engine compartment 78 forward, and cargo compartment 77 aft, on flat bed 75 supported via springs on pair of front wheels 71 and two pairs of rear drive wheels 72 connected by suitable means (not shown) to engine 73, whose muffler and exhaust pipe 79 are upright behind the cab. Fuel tank 76 is slung underneath the bed below the cab with fuel line (hidden) to the engine.

Filling station building 101 houses embodiment 100 of apparatus for evolving, collecting, and compressing fuel gas according to this invention, including electric welder 114, water tank 102, electrodes (not noted), circulating pump 103, and water-cooling heat-exchanger 104. Gas-collecting hood 106 is connected in turn to particulate (in-line) filter 107, compressor 108, and storage tank 109. Fuel delivery line 118 connects the stored fuel to metering pump 119, and fuel filling line 120 connects in turn to truck fuel compartment 76.

FIGS. 5 and 6 do not try to show connection of engine motive output to drive wheels, or indeed via electrical connection, as from a generator run by the engine, to electric motors adjunct to the wheels to drive them, both arrangements being conventional by now.

FIG. 6 shows semi-trailer 90 connected at its front end to tractor 80, by hitch 86 on flat bed 85 of the tractor, and supported at its rear end by a double pair of wheels 92. The tractor resembles the front end and undercarriage of the truck of the preceding view in having cab 84 and engine compartment 88 forward on flat bed 85. The bed is supported via springs on pair of front wheels 81 and twin pairs of rear drive wheels 82 connected by means (not shown here) to engine 83, with fuel compartment 86 slung underneath. The trailer, supported at its front end by the tractor, has lateral bulkhead 97 (broken line) dividing it into large rear cargo compartment 98 and small forward on-board fuel-manufacturing compartment 96, containing fuel evolving, collecting, compressing, and storage means of this invention, such as shown to some extent in the filling station, or in modified detail in FIG. 1. Fuel-manufacturing compartment 96, shown at about one-fifth of the trailer length, may be more compact.

FIG. 7 shows electric drive arrangement 110, wherein motor 111 connects by drive belt 115 to drive wheel 112, which otherwise would be driven by conventional mechanical connection from the engine. The motor is a FIG. 4 external load operable by FIG. 3 generator 77.

The electrode embodiment shown in FIGS. 1 and 2, wherein rod 25 is one of the electrodes, was selected originally as more suitable for location in a moving vehicle, whose movement might be conducive to dislodging or misaligning a free rod. More recent comparison of that arrangement vs. plural fixed planar electrodes bridged by a (non-electrode) carbon rod suggests that the latter is preferable. Successive rods are constrained only to be fed (mainly by gravity) to that general location and otherwise are free to move axially up and down along, and rotate about their, preferably, vertical axis.

FIGS. 8A, 8B, and 8C show, in front and side elevations and in sectional plan, alternative multi-electrode free-rod embodiment 220. As shown most fully in FIG. 8A, twin stands 221, 229 rise upright from baffle 259, to support axles 222, 228 in bearings (not shown) in the horizontal tops of the stands. Disk-like electrodes 224, 226 retained on enlarged holders 223, 227 on the tops of the axles form gap 225 at the closest approach to each other. The peripheral edges of the disks are tapered so that at their top the perimeter is less than their bottom perimeter.

Intruding, from above, down into the gap and into contact with edges of both electrodes is rod end 241 (also shown tapered here) emerging from discharge tube 244 of magazine 40 (hidden here). The axles also carry at their lower ends, within the respective stands, respective pinion gears 212 and 218 engaged by drive gears 202 and 207, carried on respective bracket-supported bearings (208 shown here for gear 228) for aligned shafts 215 and 217 interconnected by swivel 216. The shafts interconnect via universal joint 214 to shaft 213 and are rotatable by turning manual rotary crank handle 211 (top left), indicative of possible automated equivalent means. It is apparent that, upon such like rotation of the electrode disks, their edges at closest approach are moving in opposite directions. Thus, the rod will tend to rotate about its axis from such contact.

Figure 9B:
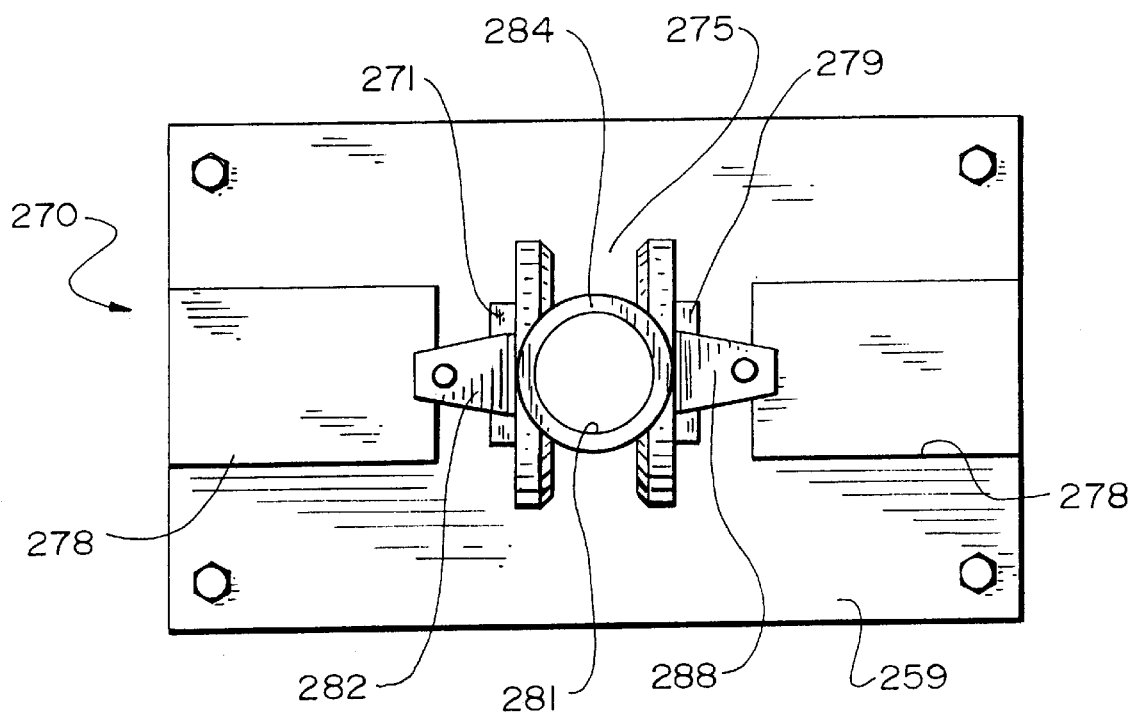
FIGS. 9A and 9B are front and side elevations of yet another electrode embodiment useful according to the present invention.
Figure 9A:
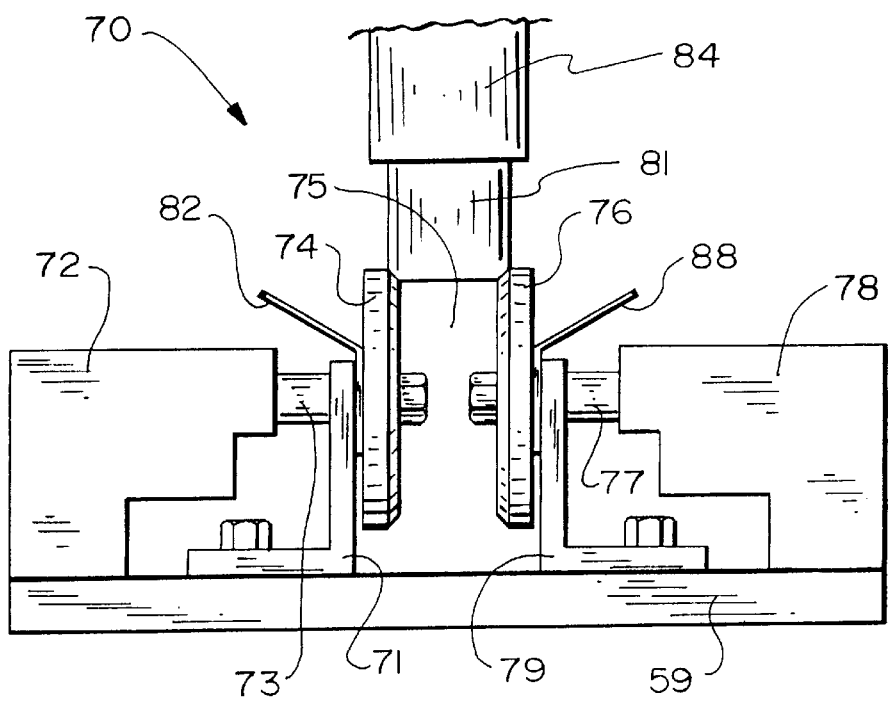

FIGS. 9A and 9B show another electrode assembly embodiment 270, from side and top, which differs from the last previous embodiment mainly by having the disklike electrodes mounted on (and rotatable about) a single horizontal axis in place of the prior vertical axes, and by substituting a motor drive for the previous manual rotation. Thus, twin angle brackets 271, 279 rise upright from baffle 259 to which they are bolted, to support axles 273, 277 in bearings (not shown) in the vertical parts of the stands. Pair of disklike electrodes 274, 276 are mounted on those horizontal axle shafts of waterproofed gear-drive motors 272, 278, with gap 275 at their closest approach to each other. The tip of rod 281 protrudes from the bottom end of discharge tube 284 and intrudes from above into the gap and into contact with edges of both electrodes. Winglike flanges 282, 288, retained against the angle brackets, are slip-ring plates connected to the power supply, which extend over axles 273, 277 to protect them from the arc.

The operation of the apparatus of this invention is understood readily from the FIG. 4 summary, in view of the description and the accompanying diagrams. Reference numerals are omitted from a more detailed description with special application to the multi-electrode embodiments onto which a succession of carbon rods is dispensed from a suitable magazine holding a supply of such conductive rods.

The electrode disks are assembled to their respective axles and the reactor is filled with enough water to submerge the electrodes. With energizing electricity (in the range of at least several dozen volts to between about 50 v. and a 100 v.) across the electrodes, a first conductive rod is lowered toward the gap, and when the rod tip gets close enough an electric arc bridges the electrodes. Bubbles of gas evolve and rise to the surface of the water. Successive bubbles collect above the water under the hood and are pumped from there through a segregation tank to a large tank for storage under a pressure up to several thousand p.s.i. or a couple hundred $kg/cm^2$.

High-temperature arcing occurs—even under water—when adequate AC or DC electrical potential, whichever is more readily available or may be preferred for some operational reason, is applied across a pair of electrodes, here preferably made substantially of graphite. Pyrolysis ensues, and some of the highly heated water dissociates into its component hydrogen and oxygen; also much carbon vaporizes. Some of the carbon oxidizes to its monoxide, and some of the carbon and/or some of the carbon monoxide oxidizes to carbon dioxide. If the electrodes were less wetted (as in Eldridge, supra) instead of being immersed in excess water—as here—the predominant carbon oxide would prove disappointingly to be dioxide instead of monoxide.

The water in the reactor tends to get progressively hotter but is kept relatively cool, preferably about 140° F. (60° C.) by heatexchange in the temperature-control system, enabling the generation of steam for whatever use and the condensation of potable water from the steam whether formed from brackish, polluted, or even sea water.

Both the conductive rod and the electrodes are consumed bit by bit by the electric arc, as is the water, whose level is maintained above the arc by added water or recirculation of steam condensate. The rods are consumed relatively rapidly and are fed in succession from the magazine above the reactor. The electrodes, being consumed more slowly, are rotated, either intermittently or continuously, so as to distribute their erosion evenly along their peripheral edges. Rotation of the electrodes about either vertical or horizontal axes (or alternatively about oblique axes) rotates the rods by either continual or intermittent contact, so the electrodes also erode fairly evenly. When the electrodes have eroded close to their axles the reactor will be shut down temporarily to enable electrode replacement and appropriate maintenance, such as reactor cleaning.

How to make, store, and use the fuel of the present invention is readily apparent from this description and foregoing diagrams. However, what happens in the electrical arc is not well understood, and need not be understood in order to practice this invention. To the extent that this specification suggests what occurs in or as a consequence of the arc, or interprets decomposition, recombination, or combustion processes, or suggests why the resulting fuel gas has or lacks certain characteristics or certain compositions, that text should be understood as being academic, speculative, or theoretical.

In contrast, operational features of this invention, sufficient to enable its practice by persons of at least ordinary skill in the relevant arts, are specified here and are readily understandable.

The water to be decomposed in the process of this invention is not subject to any unusual requirement. Most water sources prove satisfactory, including brackish or salt—as well as fresh—water, but water containing petroleum or other organics should be avoided, as they may be decomposed or be combined or reconstituted in forms not conducive to pollution-free operation of internal-combustion or other engines when operated on the fuel obtained by this invention.

The fuel gas so evolved and collected according to the present invention appears, from physical and chemical analyses, to comprise (by volume) gaseous hydrogen in major amount, as from about three to about five eighths, carbon monoxide in predominant minor amount, as from about two to about three eighths, and lesser amounts of other gases, such as carbon dioxide, hydrocarbons (or other organics), nitrogen, or oxygen—the latter in concentration insufficient for self-combustion. A representative sample might well be about half hydrogen, a third carbon monoxide, and the remainder other gases.

Carbon dioxide content is held down by presence of excess water (providing ample oxygen) and by substantial absence of long-chain hydrocarbons, such as otherwise might break down partially and then combine with oxygen released by the arc-induced water decomposition. Any hydrocarbon present is presumably so simple that it combusts to carbon dioxide and water without occupying any in-between status.

This fuel gas burns easily and evenly, with adequate access to air (about a half dozen times the fuel volume), and can operate an internal combustion engine without carburetor or injection nozzle. Conversion of gasoline vehicles to this gaseous fuel, however, may be facilitated by use of a gas fuel adapter. Suitable adapters are available from Garretson Equipment Co., Inc., Mt. Pleasant, Iowa. Also note Garretson U.S. Pat. No. 3,974,851; 4,375,798; 4,829,957.

The effluent from combustion of the fuel of this invention is substantially entirely carbon dioxide gas and water vapor, as shown by analyses of effluent from lawnmower and automobile engines fueled with it. Hydrocarbon fragments in any form are conspicuous by their absence, as are all particulates, presumably because of the facility of complete combustion of the simple components of the fuel gas. A possibility of hydrocarbon contamination exists from currently used petroleum-based lubricants, or from loosening of carbonized deposits of formerly used lubricants and fuels, especially in old engines.

Oxides of nitrogen, common in combustion products of gases from fossil fuels or of hydrogen alone, are missing (or minimal) because there is no possible source other than air, and the carbon monoxide content effectively cools and evens out combustion in the engine so as to preclude their generation by intake valve overheating, flash-back, or other hyperoxidative characteristic of hydrogen combustion.

Carbon monoxide is not found in the effluent, notwithstanding its content in the fuel itself, because carbon monoxide oxidizes so readily to carbon dioxide. Carbon monoxide in automobile exhaust gases results from insufficient combustion of gasoline hydrocarbons.

Indeed, an internal-combustion engine running on this fuel can be located in an occupied room without harming the occupants, as its operation normally reduces pre-existing concentration of ordinary pollutants in the ambient atmosphere (the combustion air source), so such engine operation cleans the air rather than contaminating it. The distinction between gasoline operation of an internal-combustion engine and its operation on the fuel gas of this invention has to be seen and smelled to be believed—and enjoyed. Effluent analysis by competent objective analysts has confirmed the merits of this fuel. Carbon monoxide is essentially completely absent from the effluent, as are unburned particulates, whether of carbon or hydrocarbons. Of course, continued operation would convert oxygen progressively into carbon dioxide, which—though harmless—will not support human life.

The odor of the gas evolved in practicing this invention is not readily identifiable but is compatible with minimal organic content, and perhaps trace(s) of ethylenic and/or acetylenic hydrocarbon(s). If the electrodes were non-carbonaceous, all of the participating carbon would have to be introduced into the arc in rod, particulate, or other suitable form, and the fuel so obtained could not reasonably be expected to be equivalent to the fuel of my invention.

The fuel gas of this invention appears to have leak-resistant capability by diffusing through semi-permeable membranes more slowly than its presumed component compositions do. Comparative testing in balloons of elastomeric material against like balloons filled with air, helium, or nitrogen can demonstrate this remarkable property.

Chemical and physical analyses of this fuel gas have failed to account for its apparent leak-resistant property. Speculation about possible presence of gaseous polymers, fullerenes, etc. has ensued. As already indicated, structural explanations of properties are not essential to production and use of the fuel gas of this invention.

No unusual materials of construction are needed in apparatus of this invention. The reactor need be only a structurally sound tank, such as steel or other metal, and is preferably grounded. The hood to receive the evolved gases may be separate from or combined with the tank. The magazine to hold and dispense carbon rods also may be made of metal, plastic, or ceramic. The magazine may accommodate any convenient number of rods, conveniently loaded at least partly upright, side-by-side on an inside surface slanting down to an exit directly above the desired electrode-bridging location, so as to be fed by gravity, although automatic feed may be adopted if preferred.

At present, graphite is preferred for the electrodes, and the rods may be composed mainly or exclusively of particulate carbon, preferably without added binder. Both are generally available, as for use in welding and other high-temperature environments and/or high-pressure environments requiring substantial chemical inertness.

Both water and carbon are relatively low-cost inputs, and the power required to pyrolize water is readily available at reasonable cost in at least most locations. The electrical potential applied across the underwater arc may be either DC (direct-current) or AC (alternating current). Conventional welding equipment operates from standard line-power AC (usually 3-phase) input, and yields a DC or AC output, as desired. AC to DC conversion without moving parts and with an improved output may be accomplished more elegantly according to Luce U.S. Pat. No. 4,870,558.

If a conventional power source is objectionable because dependent upon fossil fuels, part of the electrical power output can be applied to maintain the arc, and a small part can even be stored, as in a battery or a large capacitor, to restart the arc at any time. The chemical energy available by burning the fuel is so much greater than the energy required to maintain the arc as to be economical.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The claimed invention:

1. Motor vehicle, comprising the following:

combustion-engine means adapted to produce a mechanical output, and motive means adapted to propel the vehicle in response to said output when provided therewith; and gaseous non-alcohol-derived non-fossil-derived fuel adapted to be combusted with ambient air as the engine means emits substantially only carbon dioxide and water; and on-board means including underwater carbon arc apparatus to generate the gaseous fuel from non-organic input material, and on-board means to store for future use the fuel so generated and surplus to the engine's then current rate of consumption of such fuel.

2. Motor vehicle according to claim 1, including on-board means to liquefy surplus generated fuel for storage and future use.

3. Motor vehicle according to claim 2, wherein the means to liquefy surplus generated fuel includes a heat exchanger and coolant liquid useful in conjunction with the heat exchanger.

4. Motor vehicle according to claim 1, wherein the underwater carbon arc apparatus includes a reactor vessel plus a plurality of electrodes spaced apart underneath the surface of a body of water in the reactor vessel and thereby defining a spark gap.

5. Motor vehicle according to claim 4, including consumable carbon adapted to be introduced, as in rodlike form, end-on into the spark gap defined between the spaced apart electrodes.

6. Motor vehicle trailer, comprising an enclosure containing underwater arc reactor means for producing gaseous non-fossil fuel adapted to be combusted in internal-combustion engine means located within and providing motive force to a motor vehicle hitched to the trailer said reactor means includes an underwater spark gap adapted, when arcing, to convert the surrounding water together with carbon input to the arc into the gaseous non-fossil fuel.

7. Motor vehicle hitched to a trailer according to claim 6, and having an internal-combustion engine operating on gaseous non-fossil fuel from the reactor by combustion with ambient air into harmless effluent substantially free of particulates.

8. In a motor vehicle, the combination of engine means for providing motive power to the vehicle, and non-organic input materials to reactor means comprising an underwater arc adaped to convert carbon and water into gaseous fuel for operating the engine.

9. The combination according to claim 8, wherein the carbon is uncontaminated with compositions productive of combustion effluents other than water and carbon dioxide.

10. The combination according to claim 8, including carbon in the form of a plurality of electrodes.

11. The combination according to claim 8, including carbon in rodlike form juxtaposed end-on to the electrodes.

12. In a motor vehicle, the improvement comprising a gas generation unit for providing gas for an internal-combustion engine, comprising a reaction chamber having water therein, a pair of spaced apart carbon electrodes in said reaction chamber immersed in the water therein, means for supplying electrical current to said carbon electrodes to create an electrical arc therebetween whereby the carbon electrodes will burn and rapidly oxidize to form carbon monoxide and hydrogen.

13. Motor vehicle gas generation unit according to claim 12, wherein the water in the reaction chamber has a horizontal surface overlying the spaced electrodes and open to atmospheric pressure.

14. Motor vehicle including a gas generation unit according to claim 13.

15. Motor vehicle gas generation unit according to claim 13, including a gas-collection hood, overlying the immersed electrodes and extending from above the horizontal surface of the water to an open gas-collection end (of the hood) below the water surface.

16. Motor vehicle including a gas generation unit according to claim 15.

* * * * *